March 19, 1963 J. J. COOP 3,082,400
APPARATUS AND METHOD FOR MEASURING RELATIVE
RATES OF WATER CURRENTS
Filed Nov. 27, 1959 5 Sheets-Sheet 1
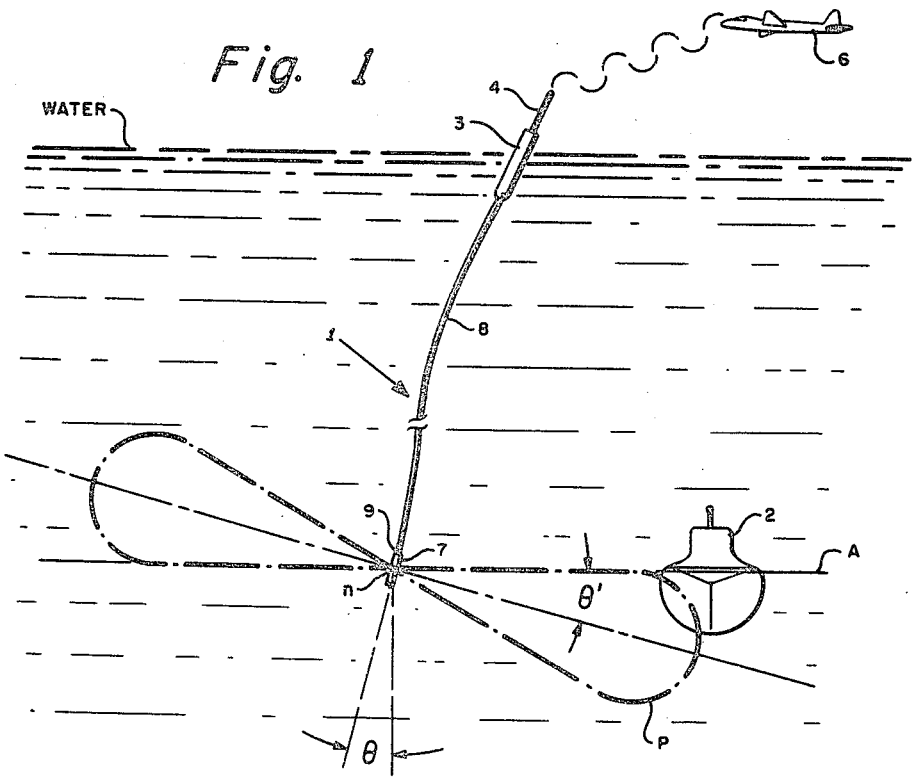
Fig. 1
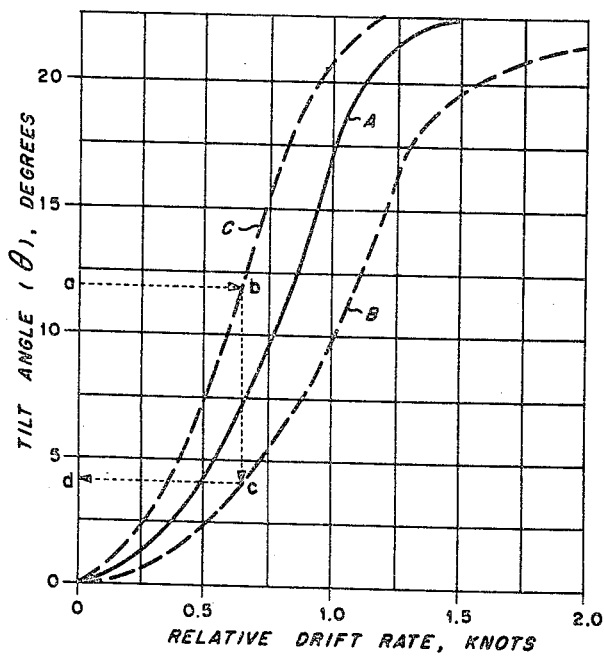
Fig. 2
INVENTOR.
JESSE J. COOP
BY 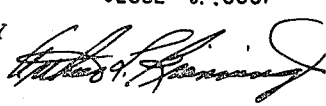
AGENT

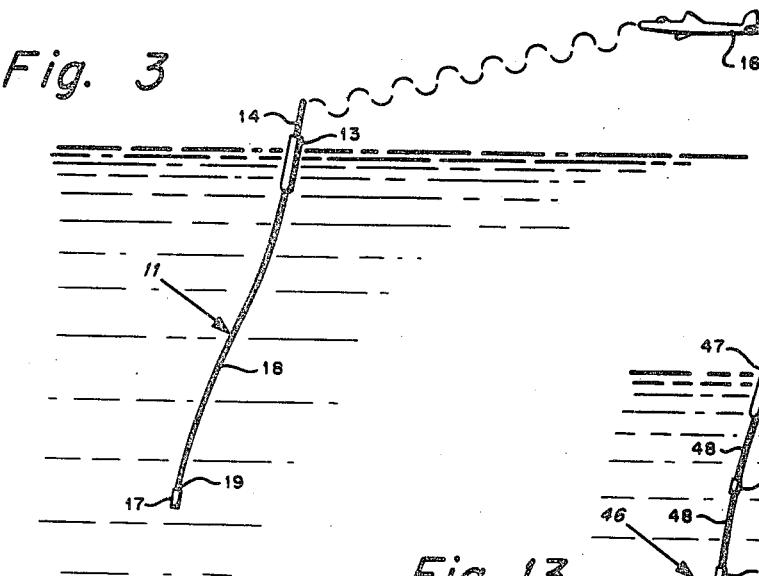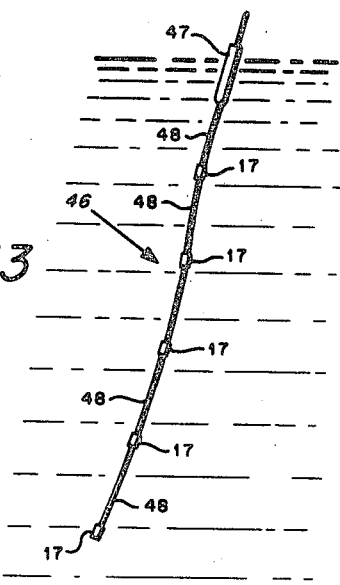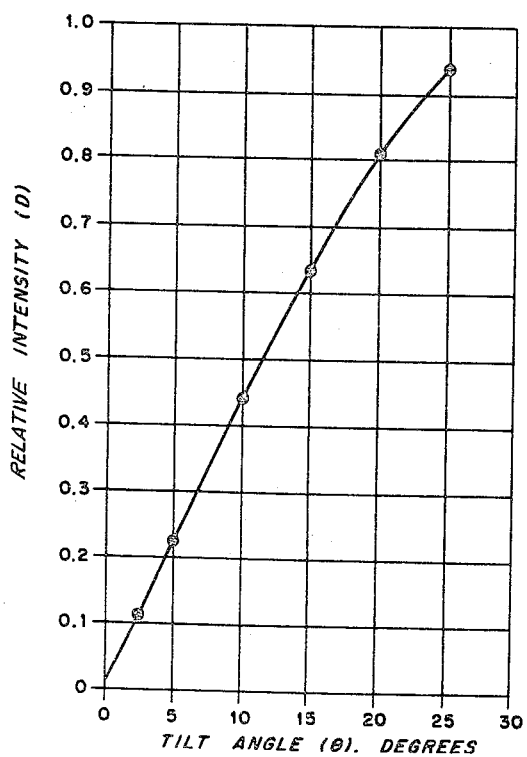

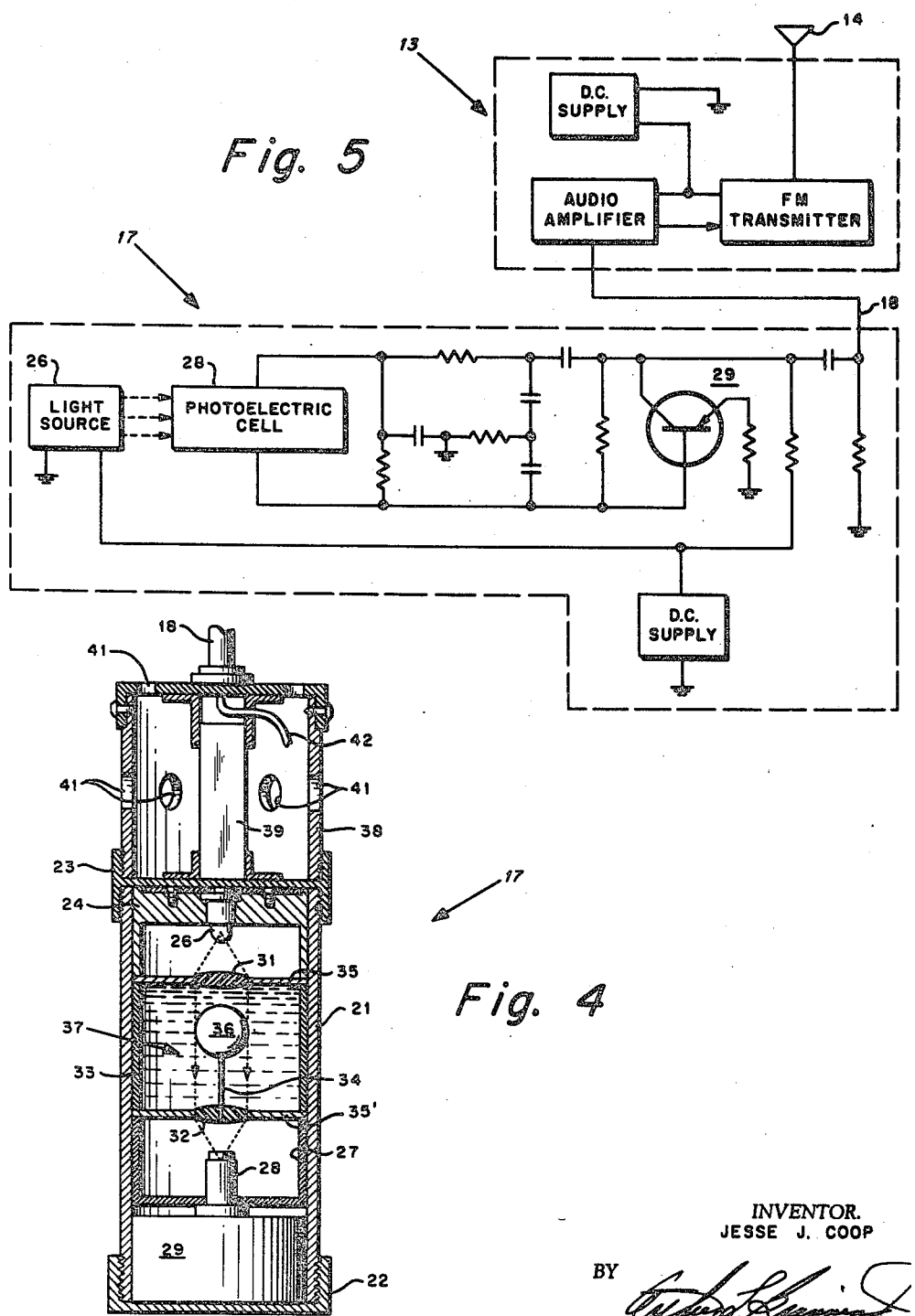

March 19, 1963   J. J. COOP   3,082,400
APPARATUS AND METHOD FOR MEASURING RELATIVE
RATES OF WATER CURRENTS
Filed Nov. 27, 1959   5 Sheets-Sheet 4
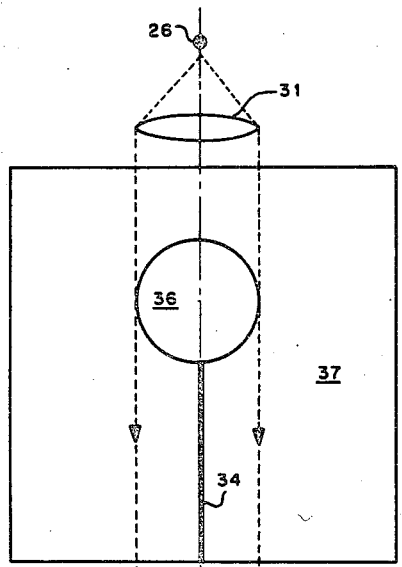
Fig. 6a
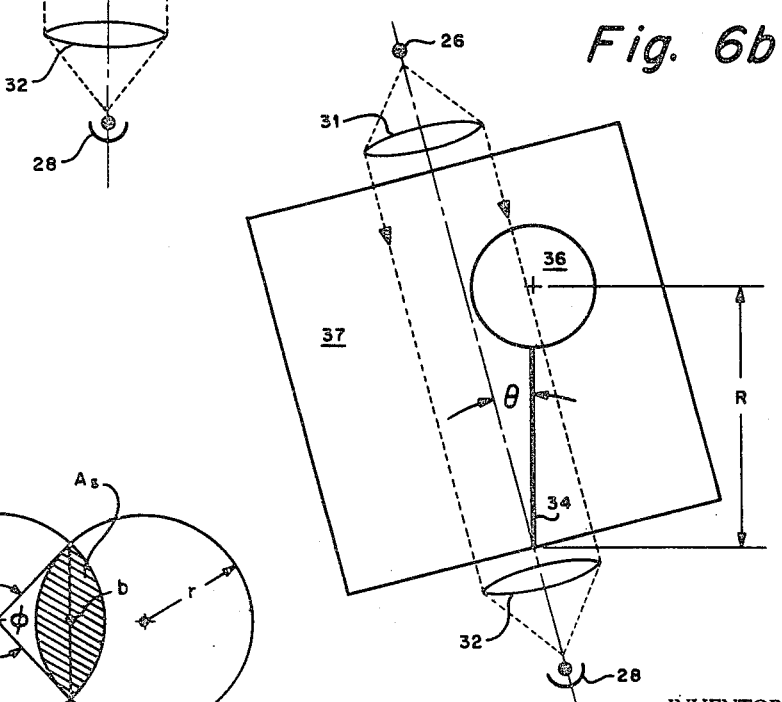
Fig. 6b
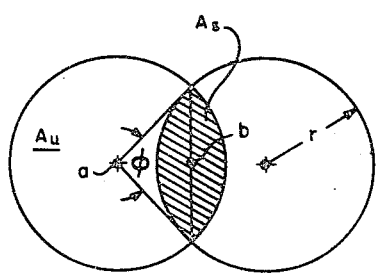
Fig. 7
INVENTOR.
JESSE J. COOP
BY 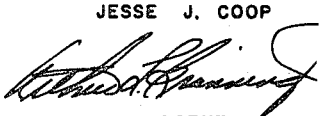
AGENT March 19, 1963    J. J. COOP    3,082,400
APPARATUS AND METHOD FOR MEASURING RELATIVE
RATES OF WATER CURRENTS
Filed Nov. 27, 1959    5 Sheets-Sheet 5
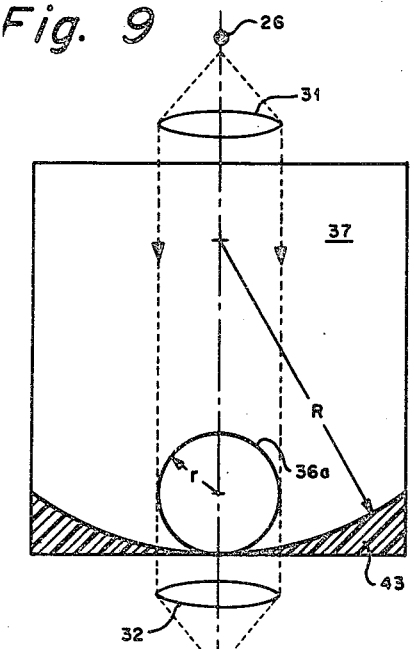
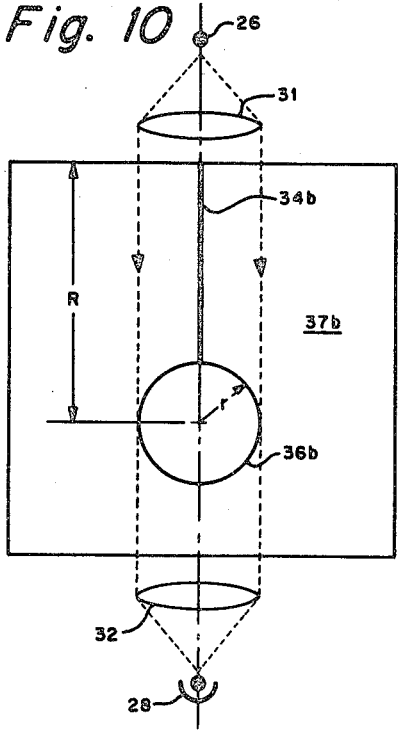
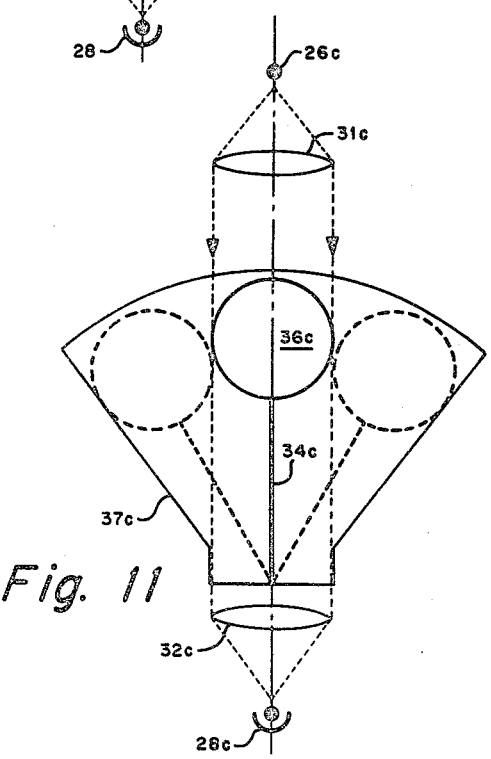
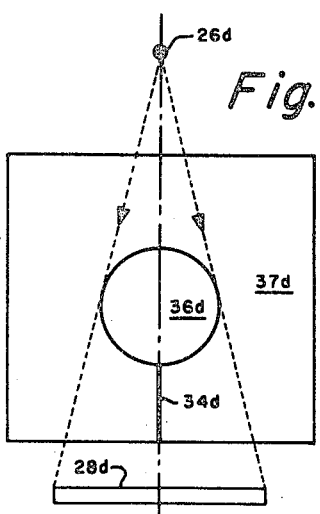
INVENTOR.
JESSE J. COOP
BY
AGENT

United States Patent Office 3,082,400
Patented Mar. 19, 1963

3,082,400
APPARATUS AND METHOD FOR MEASURING
RELATIVE RATES OF WATER CURRENTS
Jesse J. Coop, Willow Grove, Pa., assignor to the United
States of America as represented by the Secretary of
the Navy
Filed Nov. 27, 1959, Ser. No. 855,950
20 Claims. (Cl. 340—4)
(Granted under Title 35, U.S. Code (1952), sec. 266)

The invention described herein may be manufactured and used by or for the Government of the United States of America for governmental purposes without the payment of any royalties thereon or therefor.

The present invention relates to an apparatus and method for determining the utility of line-type acoustic transducers as applied in submarine detection systems and more particularly to an apparatus and method for determining the utility of line-type acoustic transducers as applied in submarine detection systems subjected to relative drift rate tilt caused by various oceanographic conditions.

In submarine detection systems employing sonar principles, it is desirable to restrict the response of the underwater acoustic transducer, hereafter referred to as a hydrophone, to sounds, such as produced by submarines and depth charges, emanating from sources laterally disposed from the hydrophone; while vertically disposed sound sources, such as echoes reflected by the ocean floor or noises produced by surface vessels are excluded. A line-type hydrophone has been found to be most suitable for this application because it is directionally responsive. Such a line-type hydrophone is suggested by U.S. Patent 1,584,613 to Comstock et al. wherein it is most sensitive to acoustical waves propagated in a plane perpendicular to the long axis constituted by the transducers arranged in a line or chain. Above a given noise level, it is known that a line-type hydrophone will also respond to sound sources within certain deviations from the above-mentioned perpendicular plane. The amount of this deviation decreases for sounds closer to the hydrophone. This phenomena defines an acoustical beam pattern which is graphically illustrated in FIG. 1 by chain line P, to be discussed later in more detail.

In order that the line-type hydrophone can be successfully applied, it is necessary to assure that its long axis will not deviate from the vertical except within certain angular limits. In this manner, the beam pattern of the hydrophone will always include sounds in a horizontal plane which intersects the hydrophone.

Ocean currents will cause the line-type hydrophone to tilt as a direct function of the velocity of the hydrophone with respect to the water velocity at the hydrophone, hereafter referred to as the relative drift rate. Hence, a high relative drift rate will produce a high tilt angle as shown in the graph identified as FIG. 2, to be discussed later in more detail. In locations having high relative drift rates, the hydrophone tilt may so incline the beam pattern from the horizontal as to render the submarine detection system ineffective.

Various means have been employed for limiting the tilt; for example, adding a sinker to the bottom of the hydrophone and interposing a compliance spring between the cable and the buoy. The extent to which these modifications reduce the tilt are obviously limited.

It should now be apparent that an inquiry into the relative drift rate under various oceanographic conditions such as wind and sea state is essential to the determination of the utility of a line-type hydrophone as applied in submarine detection systems. Heretofore, no known apparatus or method permits determination of these small and short-time-period movements of the sea because of the lack of fixed references in the open ocean. Celestial position fixing and radio fixing from shore stations do not appear to provide the required accuracy.

The present invention contemplates free-floating relative drift rate buoys and methods which permit aircraft flying at high speed to survey vast areas of the ocean in a short period so that for the first time it will be possible to obtain an approximate instantaneous picture of the ocean currents in terms of relative drift rate.

The invention, however, is not intended to be limited to measuring relative drift rate. For example, it is well known that wind velocity, duration and direction; wave height and direction; and other oceanographic factors cause a differential horizontal velocity of the water varying with depth. The magnitude of this differential as a function of depth is of interest to oceanographers, ship designers, etc. If two relative drift rate buoys having the same drag parameters and having their respective tilt sensors at different depths are dropped near each other, the difference in tilt signals, or relative drift rates, can be used to determine the relative water current rates at the two depths. This is to say, the difference in relative drift rates is equal to the difference in water current rates since the respective actual drift rates of the tilt sensor buoys are equal as determined by their equal drag parameters.

In particular, the tilt sensor per se incorporates a novel means for translating a tilt in any direction from the vertical. Additionally, by use of a number of senors along a single cable, a more accurate method of obtaining relative drift rate or relative current is afforded.

It is an object of the present invention to provide apparatus and method for determining the utility of line-type hydrophones as applied in submarine detection systems under various oceanographic conditions.

A further object of the invention is the provision of apparatus and method for accurately determining the relative drift rate of free buoys under various oceanographic conditions.

Another object of the invention is to provide apparatus for measuring tilt in any direction from the vertical position.

Still another object of the invention is to provide apparatus for measuring tilt in any direction from the vertical position as a function of light intensity.

Still another object of the invention is to provide apparatus and method for accurately determining the relative current rate of water at different depths under various oceanographic conditions.

Other objects and many of the attendant advantages of this invention will be readily appreciated as the same becomes better understood by reference to the following detail description when considered in connection with the accompanying drawings wherein:

FIG. 1 diagrammatically illustrates a side elevation of a line-type hydrophone suspended from a free buoy in the sea;

FIG. 2 is a graphical representation of a drag characteristic of a body pivotally supported at its top;

FIG. 3 is a diagrammatic illustration in a side elevation of a relative drift rate buoy in open sea;

FIG. 4 illustrates in detailed structure a cross-section view of a preferred embodiment of a collimating-type tilt sensor;

FIG. 5 is a combined schematic and block diagram of the electrical circuit of the relative drift rate buoy of FIG. 3;

FIGS. 6a and 6b are schematic diagrams in vertical and tilted positions, respectively, of the tilt sensor shown in FIG. 4;

FIG. 7 is a graphical representation of the relationship between tilt angle and light intensity of the indicator illustrated in FIG. 4;

FIG. 8 is a plot of relative intensity versus tilt angle for the tilt sensor shown in FIG. 4;

FIGS. 9, 10, 11 and 12 are schematic diagrams of alternative embodiments of the tilt sensor shown in FIG. 4; and FIG. 13 diagrammatically illustrates, in a side elevation, another embodiment of the relative drift rate buoy for measuring the relative velocities of ocean areas at various depths.

Referring now to the drawings, wherein like reference characters designate like or corresponding parts throughout the several views, there is shown in FIG. 1 a free floating sonar buoy assembly 1, hereafter referred to as a sonobuoy, used in detecting underwater sound sources or echoes such as from a submarine 2. The sonobuoy 1 comprises a float 3 containing a radio transmitter and antennae 4 for sending signals to an aircraft 6 received from a line-type hydrophone 7 connected to the float 3 by a cable 8. The hydrophone 7 is pivotally connected to cable 8 at point 9. In contrast to a single-point type hydrophone which is equally responsive to sounds propagated from any direction, the line-type hydrophone is maximally responsive to acoustical waves propagated along a line perpendicular to the longitudinal axis of the hydrophone. Such a hydrophone is disclosed in U.S. Patent 1,584,613 to Comstock et al. As mentioned above, the line-type hydrophone has an acoustical beam pattern or major lobe P whose half-angle is shown by the letter $\theta'$ which, as shown in FIG. 1, is the same as the hydrophone tilt angle $\theta$ when one side of the lobe P coincides with a horizontal line A intersecting the hydrophone 6 at node $n$. It is thus seen that if tilt angle $\theta$ substantially exceeded $\theta'$, the hydrophone could not detect sounds originating or reflected from a submarine 2 (viewed from the forward end), as shown.

Curve A of FIG. 2 graphically represents a typical drag characteristic of a body pivotally suspended at its top in a moving fluid in terms of the velocity of the fluid with respect to the body, herein identified as relative drift rate, versus the angle of tilt of the body due to drag. By precalibration, a similar curve B can be constructed for the hydrophone 7 pivotally suspended at point 9 in a moving fluid wherein the tilt angle corresponds to $\theta$ in FIG. 1.

FIG. 3 represents a relative drift rate buoy 11 used in measuring tilt of a body under varying relative drift rates. The buoy 11 comprises a float 13 containing a radio transmitter and antennae 14 for sending signals to an aircraft 16 received from a tilt sensor 17 connected to the float 13 by cable 18. The tilt sensor 17 is pivotally connected to cable 18 at point 19. The drag parameters of the tilt sensor 17 may be made the same as the hydrophone 7 so that its tilt characteristic coincides with the hydrophone curve B. If the parameters differ, a curve C may result.

A preferred embodiment of the tilt sensor 17 is shown in detail in FIG. 4. The cylindrical casing 21 is closed against water leakage at the bottom by cap 22 and at the top by wall 23. Upper collar 24 retains an electric bulb 26 considered as a point light source. Lower collar 27 retains a photoelectric cell 28 of the transistor-type whose output is connected to an oscillator 29. A pair of converging or collimating lenses 31 and 32 are seated in rings 35 and 35' which are held against collars 24 and 27, respectively, by spacer ring 3. A flexible thread 34, such as nylon, is secured to the center of lower lens 32 and to an opaque sphere 36. The chamber 37 is filled with a clear viscous liquid whose density is greater than sphere 36 whereby the sphere 36 tends to rise. Preferred materials for the sphere and liquid are cork and mineral oil, respectively. The light weight cork and the viscous oil tend to suitably dampen and minimize errors due to acceleration of the assembly. The use of colored lenses, especially red, has been contemplated for the purpose of increasing the sensitivity at small tilt angles. The wall 23 also connects to cage 38 which contains a sea water activated battery 39 which provides a D.C. supply for the bulb 26 and oscillator 29 (connections are not shown). Sea water enters the cage 38 through vents 41. The output signal from oscillator 29 is connected to cable 18 by a lead partially shown as wire 42. Instead of battery 39, a conventional dry cell or mercury cell can be used, or a regulated D.C. supply may be obtained from buoy 13 via cable 18.

The manner in which an electrical signal indicative of tilt is generated by sensor 17 will be explained later in more detail. Suffice it to say here, that tilt from the vertical in any direction will permit a portion of the collimated light beam from lens 31 to pass to cell 28.

Referring now to FIG. 5, the electrical signal produced by the photoelectric cell 28 is passed to an oscillator 29 of conventional design. The output is transmitted up the cable 18 to an audio amplifier and FM transmitter located in float 13 whereupon the signal is radioed from antennae 14 to a receiver (not shown) which may be located in an aircraft or ship.

FIGS. 6a and 6b demonstrate that, for small tilt angles, the electrical response of the sensor 17 shown in FIG. 4 is approximately linearly proportional to tilt. The sphere 36, having a density less than that of the clear liquid, is suspended in the liquid by the thread 34 attached to the center at the bottom of the chamber 37. The collimating lens 31, in conjunction with the light source 26, produces a circular column of light having the same diameter as the opaque sphere 36 and concentric with the axis of the chamber 37 and the thread 34 whenever the axis of the cylinder is in the vertical direction. A second collimating lens 32 is placed at the bottom of the chamber 37 so that its optical axis coincides with the axis of the light column produced by source 26 and lens 32. The function of lens 32 is to focus the light from source 26 onto the photoelectric cell 28. With this arrangement, any horizontal displacement of the sphere 36 from the center of the column of the light will permit light to reach the photoelectric cell 28. The amount of light falling on the cell will increase with the horizontal displacement until the object 36 has moved a horizontal distance equal to its diameter. Such a displacement occurs when the chamber 37 is tilted so that its axis departs from the vertical.

From FIG. 7, the cross-sectional area A of the column of light and the opaque sphere is given by the relation $A = \pi r^2$.

Following a tilt angle of $\theta$ degrees, shown in FIGS. 6b and 7, the shaded area $A_s = r^2(\phi - \sin \phi)$ where $\phi$ is measured in radians. Then the unshaded area $A_u$ for a tilt angle of $\theta$ is given by $A_u = \pi r^2 - r^2(\phi - \sin \phi)$ or $$A_u = r^2(\pi - \phi + \sin \phi) \quad (1)$$

From FIG. 7, $$\cos \frac{\phi}{2} = \frac{ab}{r} \text{ and } \sin \frac{\theta}{2} = \frac{ab}{R}$$

hence, $$\cos \frac{\theta}{2} = \frac{R}{r} \sin \frac{\theta}{2} \quad (2)$$

Then, from Equations 1 and 2, $$A_u = r^2 \left[ \pi - \phi + \frac{2R}{r} \left( \sqrt{1 - \left(\frac{R}{r}\right)^2 \sin^2 \frac{\theta}{2}} \right) \sin \frac{\theta}{2} \right]$$

The angle $\phi$ can be computed from Equation 2 and is $$\phi = \frac{2\pi}{180} \cos^{-1} \left( \frac{R}{r} \sin \frac{\theta}{2} \right)$$

The maximum amount of the column of light will be exposed for the approximate condition by $$R\theta = 2r \text{ or } \theta = 2 \frac{r}{R}$$

A desirable maximum tilt angle may be 30°, for example, then $$\theta = \frac{2r}{R} = \frac{\pi}{6} \text{ and } \frac{R}{r} = 3.8$$

If $$\frac{R}{r} = 4, \ \theta_{max} = 28.6°$$

For this example, $$A_u = r^2 \left[ \pi - \phi + 8 \left( \sqrt{1 - 16 \sin^2 \frac{\theta}{2}} \right) \sin \frac{\theta}{2} \right]$$

where $$\phi = \frac{\pi}{90} \cos^{-1} \left( 4 \sin \frac{\theta}{2} \right)$$

The fractional signal, ratio of unshaded area to total cross-sectional area, of the column of light will, for this example, be given by $$D = \frac{A_u}{A} = 1 - \frac{\phi}{\pi} + \frac{8}{\pi} \left( \sqrt{1 - 16 \sin^2 \frac{\theta}{2}} \right) \sin \frac{\theta}{2} \quad (3)$$

where $D$ represents the equivalent deflection of a linear indicator. A plot of Equation 3 is given in FIG. 8.

Alternative constructions of the tilt sensor 17 shown in FIG. 4 are possible. For example, in FIG. 9, an opaque sphere 36a rolls on a transparent, spherically concave surface 43. Obviously, the sphere must have a density higher than the liquid.

In FIG. 10, an opaque sphere 36b, more dense than the fluid, is suspended downward by thread 34b.

FIG. 11 illustrates a truncated-cone container, a possible change in shape of the chamber 37c, thus permitting the use of a large diameter for the opaque sphere 36c, but without any increase in total volume of the chamber 37c as would be required for the cylindrical form of chamber 37 of FIGS. 4, 9 and 10.

The above embodiments of the tilt sensor 17 utilize a collimated light beam and a small target in the photoelectric cell 28. The relation of signal intensity to tilt angle for each of these embodiments is mathematically shown by Equation 3 above and the graph of FIG. 8. Still another alternative construction of the tilt sensor is illustrated diagrammatically in FIG. 12. The point light source 26d radiates through the liquid in chamber 37d to a disc-type selenium photoelectric cell 28d without collimation of the light beams. The cell 28d is responsive to light over its circular area. An opaque sphere 36d is suspended in the liquid by thread 34d so that all of the light is blocked from cell 28d when the indicator is vertical. Horizontal displacement of the sphere 36d will permit a light quantum to impinge the cell 28d proportional to the area exposed by the displacement. A relationship between tilt angle and relative signal may be similarly derived for this construction as in the collimated sensors.

In the use of the selenium photoelectric cell instead of the transistor-type cell, a slight change in oscillatory circuitry from that shown in FIG. 5 is contemplated due to the lower impedance of selenium cells. Numerous other variations of lenses, cells, light sources, etc. from those specifically disclosed are contemplated and should be readily appreciated by a person skilled in the art.

As stated earlier, two relative drift rate buoys having the same drag parameters can be used to determine the relative velocity of ocean currents at different depths. A more accurate apparatus for obtaining this data is shown in FIG. 13. A free-floating relative drift rate buoy 46 comprises a series of tilt sensors 17, of the construction contemplated by FIG. 4 or any of the disclosed alternative embodiments, suspended at fixed positions from a float 47 by means of cables 48. The output signals of the respective sensors 17 are separtely received and recorded so that, in effect, the curvature of the cable can be obtained. For a plot of curvature versus relative water rates at different depths, departure from this curve in open ocean areas would permit a more precise knowledge of the velocity versus depth distribution.

The operation of the free-floating drift rate buoy of FIG. 3 will now be summarized. Under unknown oceanographic conditions, it is necessary to survey an ocean area for determining the utility of a sonobuoy with a line-type hydrophone for a submarine detection system. A relative drift rate buoy, or a plurality thereof, is dispatched into the ocean as by an aircraft flying at high speed. Due to a velocity distribution of the ocean at varying depths, the sensor 17 will assume a tilt angle which is a function of the relative drift rate, herein defined as the velocity of the indicator with respect to the water at the indicator. The tilt of sensor 17 displaces sphere 36 (FIG. 4) out of the collimated light beam an amount proportional to the tilt angle. A D.C. voltage is generated by photoelectric cell 28 which is converted by oscillator 29 (FIG. 5) to a frequency proportional to the magnitude of the generated D.C. voltage. The oscillator output is amplified in float 13 and then transmitted back to a receiver in the aircraft where it is recorded. For a drift rate buoy having the same drag parameters as the sonobuoy, the recorded reading of tilt angle is directly determinative of hydrophone utility under the existing sea state. For a relative drift rate buoy employing a tilt sensor 17 of different drag parameters than the hydrophone (float and cable lengths being the same) reference to a graph as shown in FIG. 2 is required. For example, if curve C represents the drag characteristic of the sensor 17 and curve B represents the drag characteristic of the hydrophone, a reading of 12° tilt of the sensor will correspond to 4° tilt of the hydrophone as indicated by the broken line a—b—c—d on the graph.

It should be understood, of course, that the foregoing disclosure relates to only preferred embodiments of the invention and that numerous modifications and variations may be made therein without departing from the spirit and scope of the invention as set forth in the appended claims.

What is claimed is:

1. Apparatus for measuring relative drift rate in water, comprising, in combination: a freely floating buoy containing a radio transmitter for producing and transmitting a radio signal from the apparatus to a remotely located receiver; a tilt sensor subjected to tilt for producing a signal proportional to the tilt; and a cable for suspending the sensor from the buoy and for conducting the tilt signal to the transmitter.

2. A relative drift rate buoy freely floating in water currents for detecting and transmitting a signal indicative of the velocity of the buoy with respect to the water at a desired depth, comprising, in combination: a float containing an audio amplifier, a radio transmitter, and an antennae erected on the float; the audio amplifier output being connected to the transmitter input and the transmitter output being connected to the antennae; a tilt sensor containing a light-sensitive cell, a light source, an opaque sphere interposed between the cell and the source displaceable from said position in accordance with vertical inclination of the sensor, and an oscillator whose input is connected to the cell for producing a frequency signal at its output as a function of a light intensity signal produced by the cell in accordance with the inclination; and a cable for connecting the oscillator output to the audio amplifier input.

3. Apparatus for measuring relative current rates in water, comprising, in combination: a freely floating buoy containing a radio transmitter for producing and transmitting a radio signal from the apparatus to a remotely located receiver; a plurality of tilt sensors; each of the sensors being subjected to tilt for producing a signal proportional to the tilt; and a cable for suspending the sensors from the buoy at different depths and for conducting the tilt signals to the transmitter.

4. A relative drift rate buoy freely floating in water currents for detecting and transmitting signals indicative of the velocity of the buoy with respect to the water at various depths, comprising, in combination: a float containing an audio amplifier, a radio transmitter, and an antennae erected on the float; the audio amplifier output being connected to the transmitter input and the transmitter output being connected to the antennae; a plurality of tilt sensors; each of the sensors containing a light-sensitive cell, a light source, an opaque sphere interposed between the cell and the source displaceable from said position in accordance with vertical inclination of the sensor, and an oscillator having an input and an output, the input connected to the cell for generating a tilt signal frequency at the output as a function of the light intensity signal produced by the cell in accordance with the inclination; and a cable for suspending the sensors from the float at different depths and for conducting the oscillator output signals to the transmitter.

5. A sensor device for measuring tilt, comprising: a point light source, a light-sensitive cell connected to the source and oriented for receiving a light beam from the source, an opaque sphere positioned for occluding said light beam and movable from said position transversely to and in respect of the light beam in response to tilt of the source and cell, whereby the quantum of light received by the cell is proportional to the tilt.

6. A sensor device for measuring tilt, comprising: a constant source of light, a photo-sensitive cell disposed in a fixed relation to the source for producing a signal proportional to the light quantum received by the cell; a sphere positioned for occluding the light source and movable from said position with respect to the source and cell for varying the light quantum proportionately to the tilt of the device, and an oscillator for modifying the signal whereby the modified signal is a direct function of the tilt.

7. A sensor device for measuring tilt, comprising: a constant light quantum at a point source; a light-sensitive cell having substantially a point-target area exposed in fixed relation to said source for producing a signal proportional to said light quantum received by said cell; a cylinder coaxial with an axis defined by said source and said cell; said cylinder closed at each end by a converging lens having its optical axis coinciding with said defined axis; said lenses forming a collimated light beam having focal points at the light source and the cell; a sphere in said cylinder suspended by a flexible thread from the lower end of the cylinder along the defined axis; said sphere and collimated beam having approximately equal diameters; a viscous liquid of a density greater than said sphere and filling the chamber defined by said cylinder and said sphere; an oscillator; a power supply connected to said oscillator and said light source; and means connecting said cell to said oscillator input, whereby an oscillator ouput signal is produced which is a function of the tilt of said device.

8. A sensor device for measuring tilt, comprising: a constant light quantum at a point source; a light-sensitive cell having substantially a point-target area exposed in fixed relation to said source for producing a signal proportional to said light quantum received by said cell; a cylinder coaxial with an axis defined by said source and said cell; said cylinder closed at each end by a converging lens having its optical axis coinciding with said defined axis; a transparent spherical surface concaved on its upper side disposed at the lower end of the cylinder; said lenses and surface forming a collimated light beam having focal points at the light source and the cell; a sphere in said cylinder for freely rolling on said surface; said sphere and collimated beam having approximately equal diameters; a fluid of density less than said sphere and filling the chamber defined by said cylinder and said sphere; an oscillator; a power supply connected to said oscillator and said light source; and means connecting said cell to said oscillator input, whereby an oscillator output signal is produced which is a function of the tilt of said device.

9. A sensor device for measuring tilt, comprising: a constant light quantum at a point source; a light-sensitive cell having substantially a point-target area exposed in fixed relation to said source for producing a signal proportional to said light quantum received by said cell; a cylinder coaxial with an axis defined by said source and said cell; said cylinder closed at each end by a converging lens has its optical axis coinciding with said defined axis; said lenses forming a collimated light beam having focal points at the light source and the cell; a sphere in said cylinder suspended by a flexible thread from the upper end of the cylinder along the defined axis; said sphere and collimated beam having approximately equal diameters; a viscous liquid of a density less than said sphere and filling the chamber defined by said cylinder and said sphere; an oscillator; a power supply connected to said oscillator and said light source; and means connecting said cell to said oscillator input, whereby an oscillator signal is produced which is a function of the tilt of said device.

10. A sensor device for measuring tilt, comprising: a constant light quantum at a point source; a light-sensitive cell having substantially a point-target area exposed in fixed relation to said source for producing a signal proportional to said light quantum received by said cell; a truncated-cone-shaped container coaxial with an axis defined by said source and said cell; said container closed at each end by a converging lens having its optical axis coinciding with said defined axis; said lenses forming a collimated light beam having focal points at the light source and the cell; a sphere in said container connected by a flexible thread from the small end of the container along the defined axis; said sphere and collimated beam having approximately equal diameters; a fluid filling the chamber defined by said cylinder and said sphere; the respective densities of said fluid and said sphere of amounts causing the sphere to remain suspended in the fluid; an oscillator; a power supply connected to said oscillator and said light source; and means connecting said cell to said oscillator input, whereby an oscillator output signal is produced which is a function of the tilt of said device.

11. A sensor device for measuring tilt, comprising: a constant light quantum at a point source; a disc-type, light-sensitive cell disposed in fixed relation to said source for producing a signal proportional to said light quantum received by said cell; a cylinder coaxial with an axis defined by said source and the center of said cell and having closed transparent ends; a sphere in said cylinder connected at one end along the defined axis by a flexible thread; a fluid filling the chamber defined by said cylinder and said sphere; the respective densities of said fluid and said sphere of amounts which causes the sphere to remain suspended in the fluid; said thread and said sphere of such size as to form a shadow in the plane of the cell of the same diameter as the cell; an oscillator; a power supply connected to said oscillator and said light source; and means connecting said cell to said oscillator input, whereby an oscillator output signal is produced which is a function of the tilt of said device.

12. A method for predicting the tilt of a hydrophone depending from a float and cable to be dispatched in open sea under unknown wind and current conditions, the hydrophone and its float and cable having known drag characteristics, comprising: dispatching into the sea a tilt sensor having known drag characteristics depending from a float and cable, the sensor float and cable having drag characteristics substantially identical to the hydrophone float and cable; producing a signal indicative of tilt; modulating a radio carrier wave by said signal; transmitting said modulated wave; and receiving said wave transmitted from said sensor indicative of the tilt angle.

13. A method for predicting the tilt of a hydrophone depending from a float and cable to be dispatched in open sea under unknown wind and current conditions, the hydrophone and its float and cable having known drag characteristics, comprising: dispatching a tilt sensor having known drag characteristics depending from a float and cable into the sea from a fast-moving aircraft, said sensor float and cable having drag characteristics substantially the same as the hydrophone float and cable; producing a signal indicative of tilt; modulating a radio carrier wave by said signal; transmitting said modulated wave; and receiving said wave in the aircraft transmitted from the sensor which is a function of the tilt angle.

14. A method for directly predicting the tilt of a sonobuoy to be dispatched in open sea under unknown wind and current conditions, the sonobuoy having known drag characteristics, comprising: dispatching into the sea a relative drift buoy having substantially the same drag characteristics as the sonobuoy; producing a signal indicative of tilt; modulating a radio carrier wave by said signal; transmitting said modulated wave; and receiving said wave transmitted from said relative drift buoy indicative of the tilt angle.

15. A method for predicting the tilt of a hydrophone depending from a float and cable in open sea under unknown wind and current conditions, the hydrophone and its float and cable having known drag characteristics, comprising: dispatching into the sea a tilt sensor depending from a float and cable, the float and cable having drag characteristics substantially the same as the hydrophone float and cable but having known sensor drag characteristics substantially different from the hydrophone drag characteristics; producing a signal indicative of tilt; modulating a radio carrier wave by said signal; transmitting said modulated wave; and receiving said wave from said sensor indicative of the tilt angle of the sensor; whereby the relative drift rate can be determined.

16. A method for determining the relative velocity versus depth distribution of currents in open sea, comprising: dispatching into open sea a relative drift rate means having tilt sensors of known drag characteristics suspended at known depths, producing a signal indicative of tilt, modulating a radio carrier wave by said signal, transmitting said modulated wave, and receiving said wave transmitted from said means indicative of the relative velocity at said depths.

17. A method for determining the relative velocity versus depth distribution of currents in open sea, comprising: dispatching a relative drift rate means of known drag characteristics from a fast-moving aircraft, said means having tilt sensors suspended at known depths; producing a signal indicative of tilt; modulating a radio carrier wave by said signal; transmitting said modulated wave; and receiving said wave in the aircraft transmitted from said means which is a function of the relative velocity at said depths.

18. A method for determining the relative velocity versus depth distribution of currents in open sea, comprising: dispatching into the sea at known distances apart a plurality of drift rate buoys of substantially the same known drag characteristics, said buoys having tilt sensors suspended at different known depths; producing signals indicative of tilt; modulating radio carrier waves by said signals; transmitting said modulated waves; and receiving said waves transmitted from said buoys indicative of the respective relative velocity at said depths.

19. A method for determining the relative velocity vesus depth distribution of currents in open sea, comprising: dispatching into the sea a relative drift rate buoy having tilt sensors of known drag characteristics suspended at known depths along a single cable; producing a signal indicative of tilt; modulating a radio carrier wave by said signal; transmitting said modulated wave; and receiving said waves transmitted from said buoy indicative of the respective relative velocity at said depths.

20. A sensor device for measuring tilt, comprising: a fluid container, a point light source mounted on said container and exposed to the inside thereof, a light-sensitive cell mounted oppositely of said source for receiving light therefrom, a sphere suspended inside said container by a flexible thread, a viscous fluid of density greater than said sphere filling the volume defined by said container and said sphere, said sphere having a position for occluding all of the light between said source and said cell and movable from said position transversely to and in respect of the light in response to tilt of the container; whereby the light received by said cell is proportional to the tilt.

References Cited in the file of this patent

UNITED STATES PATENTS

| | | |
|---|---|---|
| 2,208,147 | Eisler | July 16, 1940 |
| 2,317,632 | Miller | Apr. 27, 1943 |
| 2,688,250 | Roberts | Sept. 7, 1954 |
| 3,022,462 | Keiper | Feb. 20, 1962 |